United States Patent
Berends et al.

(10) Patent No.: US 11,760,948 B2
(45) Date of Patent: *Sep. 19, 2023

(54) PROCESS TO PREPARE AN ACTIVATED CARBON PRODUCT AND A SYNGAS MIXTURE

(71) Applicant: TORRGAS TECHNOLOGY B.V., Amsterdam (NL)

(72) Inventors: Robert Hugo Berends, Deventer (NL); Robin Pieter Post Van Der Burg, Amsterdam (NL)

(73) Assignee: TORRGAS TECHNOLOGY B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,994

(22) Filed: Jul. 20, 2022

(65) Prior Publication Data

US 2022/0356408 A1 Nov. 10, 2022

Related U.S. Application Data

(62) Division of application No. 16/644,373, filed as application No. PCT/NL2018/050605 on Sep. 14, 2018, now Pat. No. 11,427,774.

(30) Foreign Application Priority Data

Sep. 14, 2017 (NL) .................................... 2019553

(51) Int. Cl.
| | | |
|---|---|---|
| *C10J 3/66* | (2006.01) | |
| *C01B 32/318* | (2017.01) | |
| *C01B 32/336* | (2017.01) | |
| *C01B 3/36* | (2006.01) | |
| *C01B 3/48* | (2006.01) | |
| *C10J 3/84* | (2006.01) | |
| *C10K 3/00* | (2006.01) | |

(52) U.S. Cl.
CPC .................. *C10J 3/66* (2013.01); *C01B 3/36* (2013.01); *C01B 3/48* (2013.01); *C01B 32/318* (2017.08); *C01B 32/336* (2017.08); *C10J 3/84* (2013.01); *C10K 3/005* (2013.01); *C01B 2203/025* (2013.01); *C01B 2203/0283* (2013.01); *C01B 2203/0833* (2013.01); *C01B 2203/1205* (2013.01); *C10J 2300/0909* (2013.01); *C10J 2300/0916* (2013.01); *C10J 2300/1618* (2013.01); *C10J 2300/1625* (2013.01); *C10J 2300/1846* (2013.01); *C10J 2300/1884* (2013.01)

(58) Field of Classification Search
CPC ........ C10J 3/66; C10J 3/84; C10J 2300/0909; C10J 2300/0916; C10J 2300/1618; C10J 2300/1625; C10J 2300/1846; C10J 2300/1884; C01B 32/318; C01B 32/336; C01B 3/36; C01B 3/48; C01B 2203/025; C01B 2203/0283; C01B 2203/0833; C01B 2203/1205; C10K 3/005

See application file for complete search history.

(56) References Cited

U.S. PATENT DOCUMENTS

| | | | |
|---|---|---|---|
| 2006/0130401 A1* | 6/2006 | Giglio | .................. C01B 32/336 48/197 R |
| 2006/0204430 A1* | 9/2006 | Bool, III | .................. B01J 20/20 423/449.1 |
| 2007/0266633 A1* | 11/2007 | Tsangaris | .................. C10J 3/82 48/197 R |
| 2010/0179057 A1 | 3/2010 | Bool et al. | |
| 2012/0117815 A1 | 5/2012 | Wechsler et al. | |
| 2014/0037536 A1 | 2/2014 | Reimerink-Schats et al. | |
| 2021/0025328 A1 | 1/2021 | Bowen et al. | |

FOREIGN PATENT DOCUMENTS

| | | |
|---|---|---|
| WO | 2001068789 A1 | 9/2001 |
| WO | 2012102617 A1 | 8/2012 |
| WO | 2013005239 A1 | 1/2013 |

OTHER PUBLICATIONS

Cunliffe et al., Influence of Process Conditions on the Rate of Activation of Chars Derived from Pyrolysis of Used Tires, Energy & Fuels 1999, 13, 166-175. (Year: 1999).
Prins et al. "More efficient biomass gasification via torrefaction." Energy 31(15): 3458-3470 (2006).

* cited by examiner

*Primary Examiner* — Matthew J Merkling
(74) *Attorney, Agent, or Firm* — NIXON PEABODY LLP; Ronald I. Eisenstein; Nicole D. Kling

(57) ABSTRACT

The invention is directed to a process to prepare an activated carbon product and a gaseous fraction comprising hydrogen, carbon monoxide and a mixture of gaseous organic compounds from a solid torrefied biomass feed comprising the following steps. (i) subjecting the solid biomass feed to a pyrolysis reaction thereby obtaining a gaseous fraction comprising hydrogen, carbon monoxide and a mixture of gaseous organic compounds and a solid fraction comprising of char particles. (ii) separating the solids fraction from the gaseous fraction. and (iii) activating the char particles as obtained in step (ii) to obtain the activated carbon product.

22 Claims, No Drawings

PROCESS TO PREPARE AN ACTIVATED CARBON PRODUCT AND A SYNGAS MIXTURE

CROSS-REFERENCE TO RELATED APPLICATIONS

This application is a divisional of co-pending U.S. application Ser. No. 16/644,373 filed Mar. 4, 2020, which is a 35 U.S.C. § 371 National Phase Entry Application of International Application No. PCT/NL2018/050605 filed Sep. 14, 2018, which designates the U.S. and claims benefit under 35 U.S.C. § 119(a) of N.L. Provisional Application No. 2019553 filed Sep. 14, 2017, the contents of which are incorporated herein by reference in their entireties.

The invention is directed to a process to prepare an activated carbon product and a syngas mixture comprising hydrogen and carbon monoxide from a solid biomass feed.

In Jean-Marie Seiler et al., "Technical and economical evaluation of enhanced biomass to liquid fuel processes", Energy 35 (2010) 3587-3592, various routes for converting a solid biomass feed to syngas are described. The article mentions torrefaction, slow and fast pyrolysis as possible alternative biomass preparation processes. The optionally pre-prepared biomass is gasified in either an entrained flow gasifier or a fluidised bed gasifier where the solid biomass is fully converted into a gaseous syngas mixture.

Prins M. J. et al., "More efficient biomass gasification via torrefaction", Energy 31 (2006) 3458-3470 compares the gasification efficiency of torrefied wood and dry wood in an air blown circulating fluidized bed and in an oxygen-blown entrained flow gasifier. The torrefied wood was obtained by heating beech wood from 200° C. in 3-12 minutes to a temperature between 220 and 280° C. and maintaining this temperature for 30 minutes. The exergetic efficiency for torrefied wood was found lower than for dry wood in the air-blown gasifier. For the oxygen-blown entrained flow gasifier more exergetic energy can be conserved into the chemical product gas when torrefied wood is used in combination with a chemical quench using the volatiles as obtained when torrefacting the wood. A problem with such an integrated process is however that it requires the torrefaction process to be performed close to the gasification process. Entrained flow gasifiers are typically operated on a large scale and will thus require a large scale torrefaction process to be operated in its vicinity. This in turn requires a large logistic operation to supply the required volumes of biomass to the process. The advantages of torrefaction is that the torrefied biomass has a larger energy density than the original biomass and that the torrefied biomass is more uniform in properties than the optionally varying biomass sources. In practice one would therefore subject biomass to torrefaction at decentral locations, close to the biomass source, and transport it to a central gasification process. In such a scheme it is however less feasible to make use of the gaseous by-product of the decentral torrefaction process in a chemical quench in the gasification process.

Various patent publications have published describing variants of the process schemes described in the above referred to publications. WO2013/005239 describes a process wherein optionally dried biomass is first subjected to a pyrolysis step at between 500 and 550 C. In the pyrolysis step a charcoal like solid compound and pyrolysis gas is separately obtained. The pyrolysis gas and the charcoal like compound are contacted in a updraft gasification reactor in which reactor syngas is formed and the charcoal like compound is fully converted.

WO01/68789 describes a process to convert a relatively wet biomass, like wood, to syngas by performing a drying step and a pyrolysis step generating pyrolysis gas and char. The pyrolysis may be performed in the presence of steam generated activated carbon as the char. This activated carbon can be used in the process for purifying condensate as obtained when cooling syngas or flue gas. The pyrolysis gas is subjected to an oxidation step to obtain raw syngas and the char is gasified in a moving bed gasifier. The raw syngas still contains tar like compounds. In the gasifier char is added to the top of the moving bed gasifier wherein the char at the top of the moving bed gasifier acts as a tar filter. In this process the char product as obtained in the pyrolysis step is gasified to syngas and an ash waste product.

EP1580253 describes a process wherein a biomass feed is first carbonized to obtain char and a pyrolysis gas. The char is subsequently gasified at a high temperature and the pyrolysis gas is fed to a gas reformer. The gasification temperature is such that the ash as present in the char is converted into slag.

A disadvantage of the process of EP1580253 and similar processes is that slag is formed. The slag consists of molten minerals which compounds are naturally present in biomass. This slag may cause fouling and requires high temperature handling when discharging the slag from the process. In large scale slagging coal gasification processes this may be feasible. In smaller scale biomass gasification processes the formation of such slag is found to complicate the process. Another disadvantage is that the alkali compounds, and especially potassium, may vaporise at the higher temperatures and may cause fouling in possible downstream cooling equipment.

US2010/0270506 describes a process starting from a biomass which avoids the formation of slag. In this process a biomass feed is first contacted with a pulsed flow of oxygen in a first fluidized bed containing alpha-alumina as the fluidizing solids at a temperature of between 760 and 871° C. The formed syngas consisting of hydrogen, carbon monoxide, carbon dioxide, water and methane and a small amount of other hydrocarbons is isolated from the formed char and the alumina particles. The mixture of char and alumina is transported to a second fluidizing reactor wherein the carbon as present in the char is combusted. The heat of combustion is used to heat up the biomass feed. This is achieved by contacting part of the heated alumina of the second reactor with the biomass feed in a riser before the biomass is fed to the first reactor. In order to avoid a build-up of ash in the second reactor a purge of alumina and ash will be required.

A disadvantage of the process of US2010/0270506 is the use of fluidized beds. These reactors are large and complex, for example because of the solids handling. Furthermore the process will consume alpha-alumina particles for example by attrition and via the above referred to purge. Finally the quality of the syngas is not optimal because it contains methane and higher boiling hydrocarbons also referred to as tars. These higher boiling hydrocarbons may condense in downstream sections of the process. This is not advantageous and may result in fouling and resulting operational problems.

WO2013006035 describes a cyclone reactor for gasification of a biomass feed having a particles size of between 2 and 20 mm. An ash fraction is formed in the cyclone reactor and discharged to a waste chamber.

WO2015102480 describes a cyclone reactor in which biomass particles having a size up to 25 mm may be gasified to a mixture comprising of hydrogen and carbon monoxide. Solids, referred to as dust is separated in the cyclone reactor. The cyclone reactor may also be used for torrefaction of biomass.

The following process according to the present invention aims to avoid the above referred to problems.

Process to prepare an activated carbon product and a syngas mixture comprising hydrogen and carbon monoxide from a solid biomass feed comprising the following steps:

(i) subjecting the solid biomass feed to a pyrolysis reaction thereby obtaining a gaseous fraction comprising hydrogen, carbon monoxide and a mixture of gaseous organic compounds and a solid fraction comprising of char particles having a reduced atomic hydrogen over carbon ratio and a reduced atomic oxygen over carbon ratio relative to the solid biomass feed and wherein the solid biomass feed is a solid torrefied biomass feed, (ii) separating the solids fraction from the gaseous fraction, (iii) subjecting the gaseous fraction obtained in step (ii) to a continuously operated partial oxidation to obtain a syngas mixture further comprising water and having an elevated temperature and (iv) activating the char particles as obtained in step (ii) to obtain the activated carbon product.

The above process is advantageous because it can prepare a syngas in a simple process starting from a biomass feed while also preparing a valuable by-product. The biomass is hereby subjected to at least two subsequently performed biomass preparation processes, namely torrefaction and pyrolysis. These preparation processes are known from the earlier referred to article of Jean-Marie Seiler et al. in Energy as alternative processes to prepare biomass as feed for a gasification process. In the process according to the invention these preparation processes are both used to convert the solid biomass to a useful char product while also obtaining a gaseous mixture which can be easily converted to syngas by gasification. The process avoids the use of a heat carrier like the alpha-alumina particles. Furthermore, the syngas as prepared does not contain or at least not in any significant amount any higher hydrocarbons.

In step (i) a considerable amount of the carbon as present in the torrefied biomass feed is converted to gaseous hydrocarbons and eventually to the desired hydrogen and carbon monoxide in step (iii). The remaining char particle as isolated in step (ii) will comprise ash compounds and carbon. By isolating the char and thus also isolating the ash forming compounds as composed within the char product before performing step (iii) it possible to perform step (iii) at the higher partial oxidation temperature which favours the conversion of the hydrocarbons to hydrogen and carbon monoxide while avoiding the formation of molten slag. Such a higher temperature favours the conversion of the hydrocarbons such as the gaseous tar compounds to hydrogen and carbon monoxide. Because the ash forming compounds remains within the char product formation of molten slag is avoided in step (iii). Thus instead of trying to convert all of the carbon as present in the char as in the prior art processes the char is isolated as a valuable product of the process. The activated carbon as obtained after activation of these char particles have excellent properties in terms of BET surface area, water content and carbon content making this product a valuable product of this process.

The solid torrefied biomass feed is advantageous because it has a higher energy density than the biomass from which it is obtained, it provides a more uniform feed when the biomass to be torrefied originates from different sources and torrefied solids are more easily reduced in size.

The process shall be described in more detail below.

The solid biomass feed has been obtained by torrefaction of a starting material comprising lignocellulosic material. Such a process not only increases the heating value per mass biomass by torrefaction but may also remove a substantial amount of water, especially so-called bound-water, from the starting material comprising lignocellulosic material, further also referred to as biomass material. The energy density of the biomass material is increased by decomposing all or part of the hemicelluloses as present in the biomass. An advantage of using a torrefied biomass feed is that the properties of torrefied biomass feeds obtained from different biomass sources may be more uniform than the properties of the original biomass sources. This simplifies the operation of the process according to the invention. Another advantage is that torrefied material can easily be ground to at or near the desired particle size as described above. Such particle size reduction will be performed at a significant lower energy consumption as compared to the energy consumption of a particle size reduction of the original (non-torrefied) biomass material. When the location of the torrefaction process is distant from the location of the present process it may be advantageous to pelletize the torrefied biomass for ease of transportation. Suitably such pellets may be used as such in the process according to the invention or reduced in size.

Torrefaction is a well-known process and for example described in WO2012/102617 and in the earlier referred to publication of Prins et al. in Energy and is sometimes referred to as roasting. In such a process the biomass is heated to an elevated temperature, suitably between 260 and 310° C. and more preferably between 250 and 290° C., in the absence of oxygen. Such a process is sometimes referred to as roasting. Torrefaction conditions are so chosen that hemicelluloses decomposes while keeping the celluloses and lignin intact. These conditions may vary for the type of biomass material used as feed. The temperature and residence time of the torrefaction process is further preferably so chosen that the resulting material is easily reducible in size and has a high content of so-called volatiles, i.e. organic compounds. The solids residence time is suitably at least 5 minutes and preferably at least 10 minutes. The upper residence time will determine the amounts of volatiles which remain in the torrefied biomass. Preferably the content of volatiles is between 60 and 80 wt % and more preferably between 65 and 75 wt %. The volatile content is measured using DIN 51720-2001-03. Applicants found that the relatively high volatile content in the torrefied biomass is advantageous to achieve a more carbon efficient process from biomass to the char product and the syngas product.

In the torrefaction process the atomic hydrogen over carbon (H/C) ratio and the atomic oxygen over carbon (O/C) ratio of the biomass material is reduced. Preferably the solid torrefied biomass feed used in step (i) as feed has an atomic hydrogen over carbon (H/C) ratio of between 1 and 1.2. Preferably the solid torrefied biomass feed used in step (i) as feed has an atomic oxygen over carbon (O/C) ratio of between 0.4 and 0.6. Further the water content will reduce in a torrefaction process. The solid torrefied biomass suitably contains less than 7 wt %, and more preferably less than 4 wt % water, based on the total weight of the solid torrefied biomass.

The biomass material to be torrefied may be any material comprising hemicellulose including virgin biomass and waste biomass. Virgin biomass includes all naturally occurring terrestrial plants such as trees, i.e. wood, bushes and grass. Waste biomass is produced as a low value by-product of various industrial sectors such as the agricultural and forestry sector. Examples of agriculture waste biomass are corn stover, sugarcane bagasse, beet pulp, rice straw, rice hulls, barley straw, corn cobs, wheat straw, canola straw, rice straw, oat straw, oat hulls and corn fibre. A specific example is palm oil waste such as oil palm fronds (OPF), roots and trunks and the by-products obtained at the palm oil mill, such as for example empty fruit bunches (EFB), fruit fibers, kernel shells, palm oil mill effluent and palm kernel cake. Examples of forestry waste biomass are saw mill and paper mill discards. For urban areas, the best potential plant biomass feedstock includes yard waste (e.g., grass clippings, leaves, tree clippings, and brush) and vegetable processing waste. Waste biomass may also be Specified Recovered Fuel (SRF) comprising lignocellulose.

The biomass material to be torrefied may be a mixture originating from different lignocellulosic feedstocks. Furthermore, the biomass feed may comprise fresh lignocellulosic compounds, partially dried lignocellulosic compounds, fully dried lignocellulosic compounds or a combination thereof.

The solid torrefied biomass feed as used in step (i) may be comprised of solids having a solid particle dimensions which ranges from a few centimetres to even less than 2 mm. The optimal size of the particles depends on the type of reactor and conditions applied in step (i). The torrefied biomass may be obtained in the form of pellets as explained above. Such pellets are obtained by pressing the torrefied powder into a shape. Such pellets may have any shape, such as cylinders, pillow shape like in briquettes, cubes. Preferably the smallest distance from the surface of such a pellet to its centre is less than 10 mm. This is advantageous for mass transport within the pellet while performing the pyrolysis, and especially a slow pyrolysis, in step (i). For example, a pellet having the shape of a cylinder suitably has a diameter of between 5 and 12 mm and preferably between 5 and 10 mm. The length of such cylinders may be between 5 and 50 mm. These pellets can be directly used as feed to the present process or may be reduced in size by means of a simple ball milling or hammermilling process.

Applicants found that when pellets are used in a slow pyrolysis process as for example describe below char particles will be obtained in step (i) as particles having substantially the same shape as the starting pellet. It was also found that the active surface area of these char particles is higher than the products obtained when non-pelletised torrefied feedstock is used. When such a pellet derived char product is further activated in step (iv) a product is obtained having even higher active surface area as compared to when non-pelletised torrefied feedstock is used. This makes the obtained char product even more useful in various applications. If for example non-torrefied wood pellets are subjected to the same pyrolysis conditions the wood pellet would disintegrate due to the resulting steam formation.

Step (i) is preferably performed at so-called non-slagging conditions. This avoids the formation of slag and thus no special measures have to be taken for discharge of the slag and/or protection of the process equipment against the slag or molten slag. The latter enables one to use simpler process equipment. These non-slagging conditions are suitably achieved by performing step (i) at a temperature of below 1100° C. and preferably below 1000° C. At these higher temperatures the solid residence time is preferably low. When performing step (i) at lower temperatures the residence time may be higher as will be described in more detail below. The residence time will be chosen such that the reduction in atomic hydrogen over carbon (H/C) ratio of the solids in step (i) is greater than 50% and the reduction in atomic oxygen over carbon (O/C) ratio of the solids in step (i) is greater than 80%. The char particles as obtained preferably have an atomic hydrogen over carbon (H/C) ratio of between 0.02 and 0.4 and an atomic oxygen over carbon (O/C) ratio of between 0.01 and 0.06.

The absolute pressure at which step (i) and subsequent steps is performed may vary between 90 kPa and 10 MPa and preferably between 90 kPa and 5 Mpa. Pressures at the higher end of these ranges are advantageous when the syngas is to be used in downstream processes which require a syngas having such elevated or even higher pressures. The lower pressure range may be used when the syngas is used as fuel for a gas engine or steam boiler to generate electricity. Men step (i) is performed at an elevated pressure the solids and an optional carrier gas will have to be brought to that pressure level before being able to feed this mixture to a reactor in which step (i) is performed. This pressurisation of the solid biomass may be performed in a lock hopper as described in U.S. Pat. No. 4,955,989 and US2011100274. Pressurisation may also be performed using a solids pump as for example described in U.S. Pat. No. 4,988,239 or US2009178336.

In step (i) a gaseous fraction comprising hydrogen, carbon monoxide and a mixture of gaseous organic compounds and a solid fraction comprising of char particles is obtained. The gaseous organic compounds may comprise of non-condensed organic compounds which are formed in step (i). These compounds range from methane to organic compounds having up to 50 carbons and even more. The organic compounds include hydrocarbons and oxygenated hydrocarbons. The fraction of these organic compounds in the gaseous fraction obtained in step (ii) may be greater than 15 wt %. The gaseous fraction obtained in step (i) may also contain sulphur compounds, such as hydrogen sulphide, sulphinated hydrocarbons and chlorine containing compounds like hydrogen chloride and nitrogen containing compounds like ammonia and hydrogen cyanide. The amount of the latter compounds will depend on the composition of the feed material.

Step (i) is preferably performed as a pyrolysis process wherein the required heat for performing the pyrolysis reaction can be supplied by indirect heat exchange or directly by combustion of part of the torrefied biomass feed or by combustion of an additional gaseous or liquid fuel.

Suitably a pyrolysis process is performed in step (i) at temperature of between 350 and 500° C. and at a solid residence time of between 5 and 15 minutes. The pyrolysis process is suitably performed in the absence of added oxygen. The required temperature is therefore achieved by indirect heat exchange, for example by means of flue gasses running through for example heating pipes or a heating mantle. The pyrolysis may be achieved by feeding the solid torrefied biomass to a screw reactor in which the pyrolysis takes place. The solid torrefied biomass may be fed as pellets to the screw reactor. Preferably the char particles as obtained at the outlet of the screw reactor are subjected to a post-conditioning step prior, after or during step (ii) wherein the solids are subjected to a temperature of between 450 and 800° C. At this temperature additional gaseous fraction is obtained from the char particles. It is believed that the water as present in this gaseous fraction performs reforming reactions. The temperature in the post conditioning step will be higher than the temperature in the pyrolysis step. This pyrolysis and post-conditioning process may be performed as is described in US2017/0114284, WO16134794 and WO16189138.

The post conditioning step may be performed as a batch process wherein gaseous products are continuously or intermittently withdrawn from the post conditioning reactor vessel, for example when the pressure build up in the vessel becomes above a certain level. The post conditioning may also be performed by subjecting the solids to a temperature of between 450 and 800° C. in a downward moving packed bed such that a further gaseous fraction is obtained from the char particles which is discharged from the packed bed in an upward direction. Char particles from the extruder may be supplied to the upper end of the bed and post treated char particles can be discharged from the lower end of the bed. This is preferably performed in a continuous process. The required temperature can be achieved by heating coils in the bed and/or by a heating mantle through which flue gasses flow.

The pyrolysis process in step (i) may also be performed at a temperature of between 500 and 800° C. and at a solid residence time of above 10 minutes in a rotary kiln furnace. In such a furnace the biomass is continuously transported from an inlet at one end of an elongated, preferably tubular, furnace to an outlet at the other end of the elongated furnace. The means to move the biomass along the length of the furnace may be by means of a rotating wall and/or by rotating means within the furnace. The residence time is preferably between 10 and 60 minutes. The pyrolysis process may be performed in the absence of added oxygen. Preferably the required temperature is achieved by a combination of indirect heat exchange, for example by means of flue gasses running through heating pipes or a heating mantle and a partial oxidation of part of the gaseous fraction as generated in the furnace. The partial oxidation is preferably achieved by adding an oxygen comprising gas. The oxygen comprising gas may be oxygen, air or enriched air. The purity of the oxygen comprising gas is preferably at least 90 vol %, more preferably at least 94 vol %, wherein nitrogen, carbon dioxide and argon may be present as impurities. Substantially such pure oxygen is preferred, such as prepared by an air separation unit (ASU) or by a water splitter, also referred to as electrolysis. The amount of oxygen fed to the pyrolysis process in step (i) is preferably between 0.1 and 0.3 mass oxygen per mass biomass as fed to step (i). DE19720417 describes a pyrolysis process in which a rotary kiln is used in a pyrolysis process. U.S. Pat. No. 5,769,007 describes a suitable rotary kiln reactor. The char obtained in this process may be subjected to a post treatment as described above.

Applicants found that when the pyrolysis process in step (i) is performed at a temperature of between 500 and 800° C. and at a solid residence time of between 10 and 60 minutes as for example described above and wherein the torrefied biomass feed is supplied as pellets such as described above a char product may be obtained in step (i) having a BET ($N_2$) surface areas of between 300 and 500 $m^2/g$.

If step (ii) is performed as a separate step it may be performed using any known solids-gas separation technique at high temperature, suitably between 600 and 1000° C., to avoid condensation of the heavy hydrocarbons and to sustain high energy efficiencies of the combined steps (i), (ii) and (iii). Preferably a technique is used wherein use is made of centrifugal forces, like in a cyclone to remove dust from the gaseous fraction. A series of two or even more cyclones may be applied to achieve a good separation of the solid char particles and the gaseous fraction. To separate even more of the solids at the elevated temperatures of the gaseous fraction between step (i) and step (iii) filters, like candle filters may be used. The larger solids fraction can be separated from the gaseous fraction by means of simple gravitational forces.

The gaseous fraction as obtained in step (ii) is subjected in a step (iii) to a partial oxidation to obtain the syngas mixture. Step (iii) is performed in the absence of the separate solids fraction obtained in step (ii). In this step (iii) the C1 and higher hydrocarbons and oxygenates as present in the gaseous fraction are mainly converted to hydrogen and carbon monoxide. Preferably the gaseous fraction obtained in step (ii) is subjected to a partial oxidation step (iii) at a temperature of between 1000 and 1600 C, more preferably between 1100 and 1600 C and even more preferably between 1200 and 1500° C., and at a residence time of less than 5 seconds, more preferably at a residence time of less than 3 seconds. The residence time is the average gas residence time in the partial oxidation reactor. The partial oxidation is performed by reaction of oxygen with the organic compounds as present in the gaseous fraction, wherein a sub-stoichiometric amount of oxygen relative to the combustible matter as present in the gaseous fraction is used.

The oxygen comprising gas used in step (iii) is suitably of the same composition as the oxygen comprising gas as described for the pyrolysis above. The total amount of oxygen fed to step (i) and to step (iii) is preferably between 0.1 and 0.6 mass oxygen per mass biomass as fed to step (i) and more preferably between 0.2 and 0.4 mass oxygen per mass biomass as fed to step (i).

A suitable partial oxidation process for step (iii) is for example the Shell Gasification Process as described in the Oil and Gas Journal, Sep. 6, 1971, pp. 85-90. In such a process the gaseous fraction and an oxygen comprising gas is provided to a burner placed at the top of a vertically oriented reactor vessel. Publications describing examples of partial oxidation processes are EP291111, WO9722547, WO9639354 and WO9603345.

The syngas as obtain in step (iii) will have an elevated temperature. This hot gas is suitably reduced in temperature by indirect heat exchange against evaporating water. For example, in an adjacent boiler as for example described in WO07131975 and US2007267171. In such a boiler steam and superheated steam may be produced. Preferably this steam is used in the activation step (iv) and/or to provide indirect heat in the pyrolysis step (i). The gas obtained in step (iii) may also be reduced in temperature by a direct quench with water. Combinations of the above direct and indirect temperature reducing processes are also possible.

The syngas mixture as prepared by the above process may be directly used as fuel for example to generate electricity. The syngas mixture may be subjected to a water gas shift reaction to convert part of all of the carbon monoxide to carbon dioxide and water to hydrogen. Such a water gas shift reaction could be beneficial to increase the hydrogen to carbon monoxide ratio as required in downstream processes or to produce hydrogen. The hydrogen can for example be used as fuel for fuel cells, fuels for hydrogen powered combustion engines and gas turbines or it can be mixed into the natural gas grid. Preferably the obtained syngas mixture is used as feedstock in various processes to make chemicals and fuels, such as the Fischer-Tropsch process, methanation process, methanol process, acetic acid process, ammonia process and DME process.

In step (iv) the char particles as obtained in step (iii) are activated to obtain the activated carbon product. Activation may be performed by means of a carbonization process, oxidation process or by a chemical activation or by combinations of these processes. The process may be a carbonization process wherein the char particles are heated to a temperature of between 800 and 1000° C. in an inert atmosphere. In this process pyrolysis takes place. The inert atmosphere may be achieved using gases like for example argon or nitrogen. The activation may also be by means of an oxidation process wherein the char particles are contacted with steam and/or oxygen at a temperature of between 700 and 1200° C. Preferably only steam is used because such a process is more stable. The gasses as produced in such an oxidation activation may contain hydrogen and carbon monoxide which may be combined with the syngas as obtained by the process of this invention. Preferably the gasses as produced are subjected to the continuously operated partial oxidation step (iii) wherein possible higher boiling hydrocarbons in these gasses are converted to hydrogen and carbon monoxide. Preferably the activation in step (iv) is an oxidation process wherein the char particles are contacted with steam which is obtained by evaporation of water in an indirect reduction of temperature of the syngas mixture having an elevated temperature as obtained in step (iii). This allows one to use steam produced in step (iii) in an advantageous manner in step (iv). Chemical activation may be used to obtain even more improved activated carbon. In this process the char particles are impregnated with one or more chemicals, like for example phosphoric acid, potassium hydroxide, sodium hydroxide, calcium chloride or zinc chloride. The impregnated char particles are subsequently carbonized at 450-900° C. A disadvantage of the chemical activation is the usage of chemicals and the resulting chemical waste.

The activated carbon as obtained after activation of these char particles have excellent properties in terms of BET surface area, water content and carbon content making this product a valuable product of this process. Activated carbon having a BET ($N_2$) surface areas of above 700 $m^2/g$, moisture content of below 0.8 wt % and even below 0.6 wt % and carbon content of above 85 wt % and even 90 wt % have been prepared by this process starting from the solid torrefied biomass.

The invention claimed is:

1. A process to prepare an activated carbon product and a gaseous fraction comprising hydrogen, carbon monoxide, and a mixture of gaseous organic compounds from a solid biomass feed the method comprising the following steps:
   (i) subjecting the solid biomass feed to a pyrolysis reaction in the presence or absence of added oxygen, thereby obtaining
      (a) a gaseous fraction comprising hydrogen, carbon monoxide, and a mixture of gaseous organic compounds and
      (b) a solid fraction comprising of char particles having a reduced atomic hydrogen over carbon ratio and a reduced atomic oxygen over carbon ratio relative to the solid biomass feed;
      wherein the solid biomass feed are pellets of a solid torrefied biomass feed;
   (ii) separating the solid fraction from the gaseous fraction; and
   (iii) activating the char particles obtained in step (ii) to obtain the activated carbon product.

2. The process according to claim 1, wherein the solid torrefied biomass feed has a content of volatiles between 65 and 75 wt %.

3. The process according to claim 1, wherein the solid torrefied biomass feed has an atomic hydrogen over carbon (H/C) ratio of between 1 and 1.2.

4. The process according to claim 3, wherein the solid torrefied biomass feed has an atomic oxygen over carbon (O/C) ratio of between 0.4 and 0.6.

5. The process according to claim 1, wherein the reduction in atomic hydrogen over carbon (H/C) ratio of the solids in step (i) is greater than 50% and the reduction in atomic oxygen over carbon (O/C) ratio of the solids in step (i) is greater than 80%.

6. The process according to claim 1, wherein step (i) is performed at a temperature of between 350 and 500° C. and at a solid residence time of between 5 and 15 minutes.

7. The process according to claim 6, wherein the char particles as obtained are subjected to a post-conditioning step prior, after, or during step (ii) wherein the solids are subjected to a temperature of between 450 and 800° C. in a downward moving packed bed such that a further gaseous fraction is obtained from the char particles which is discharged from the packed bed in an upward direction.

8. The process according to claim 7, wherein steam is supplied to the lower end of the packed bed.

9. The process according to claim 1, wherein step (i) is performed at a temperature of between 500 and 800° C. and at a solid residence tune of between 10 and 60 minutes in a rotary kiln furnace.

10. The process according to claim 1, wherein the pellets have the shape of a cylinder having a diameter of between 5 and 12 mm and a length of between 5 and 50 mm.

11. The process according to claim 1. wherein the char products obtained have substantially the same shape as the pellets of torrefied biomass.

12. The process according to claim 1, wherein step (i) is performed at a temperature of between 500 and 800° C. and at a solid residence time of between 10 and 60 minutes.

13. The process according to claim 1, wherein step (ii) is performed at a temperature of between 600 and 1000° C.

14. The process according to claim 1. wherein the gaseous fraction obtained in step (ii) is subjected to a continuously operated partial oxidation to obtain a syngas mixture further comprising water and having an elevated temperature.

15. The process according to claim 14, wherein the partial oxidation is performed at a temperature of between 1100 and 1600° C. and at a residence time of less than 5 seconds.

16. The process according to claim 15, wherein the partial oxidation is performed at a temperature of between 1200 and 1500° C. and at a residence time of less than 3 seconds.

17. The process according to claim 1, wherein the activation in step (iii) is a carbonization process,
   wherein the char particles are heated to a temperature of between 800 and 1000° C. in an inert atmosphere.

18. The process according to claim 14, wherein the activation in step (iii) is an oxidation process,
   wherein the char particles are contacted with steam and/or oxygen at a temperature of between 700 and 1200° C.

19. The process according to claim 18, wherein the activation in step (iii) is an oxidation process,
   wherein the char particles are contacted with steam which is obtained by evaporation of water in an indirect reduction of temperature of the syngas mixture having an elevated temperature as obtained in the partial oxidation.

20. The process according to claim 18, wherein the gasses as produced in such an oxidation activation are subjected to the continuously operated partial oxidation.

21. The process according to claim 1, wherein step (i) comprises subjecting the solid biomass feed to a pyrolysis reaction in the presence of added oxygen.

22. The process according to claim 21, wherein the added oxygen is between 0.1 and 0.3 mass oxygen per mass solid biomass feed.

* * * * *